United States Patent [19]

Cox

[11] Patent Number: 5,006,361
[45] Date of Patent: Apr. 9, 1991

[54] LIPID PELLETIZATION METHODS, APPARATUS AND PRODUCTS

[76] Inventor: James P. Cox, 246 E. Bartlett Rd., Lynden, Wash. 98264

[21] Appl. No.: 131,298

[22] Filed: Dec. 8, 1987

Related U.S. Application Data

[60] Continuation of Ser. No. 609,541, Nov. 29, 1983, abandoned, which is a continuation-in-part of Ser. No. 447,622, Dec. 7, 1982, abandoned, and Ser. No. 447,130, Dec. 6, 1982, abandoned, which is a division of Ser. No. 193,434, Oct. 3, 1980, Pat. No. 4,362,748, said Ser. No. 447,622, is a continuation-in-part of Ser. No. 193,434.

[30] Foreign Application Priority Data

Jan. 29, 1983 [WO] PCT Int'l Appl. .................. PCT/US83/01869

[51] Int. Cl.$^5$ .............................................. A23K 1/00
[52] U.S. Cl. ...................................... 426/601; 426/96; 426/98; 426/574; 426/575; 426/602; 426/656; 426/807
[58] Field of Search .................. 426/602, 601, 96, 99, 426/98, 93, 574, 575, 807, 805, 656

[56] References Cited

U.S. PATENT DOCUMENTS

| | | | |
|---|---|---|---|
| 2,403,547 | 7/1946 | Perschardt | 426/103 |
| 3,093,483 | 6/1963 | Ishler et al. | |
| 3,658,550 | 4/1972 | Hawley | 426/574 |
| 3,919,435 | 11/1975 | Feldbrugge et al. | 426/574 |
| 3,925,560 | 12/1975 | Scott et al. | 426/93 X |
| 4,042,718 | 8/1977 | Rawlines et al. | 426/93 X |
| 4,098,913 | 7/1978 | Baugher | 426/573 |
| 4,348,418 | 9/1982 | Smith et al. | 426/575 X |
| 4,362,748 | 12/1982 | Cox | 426/575 X |

FOREIGN PATENT DOCUMENTS

| | | | |
|---|---|---|---|
| 0138346 | 8/1983 | Japan | 426/575 |
| 0185696 | 10/1983 | Japan | 426/575 |
| 303819 | 11/1971 | U.S.S.R. | 426/575 |
| 1579324 | 11/1980 | United Kingdom | 426/575 |

OTHER PUBLICATIONS

The Random House Dictionary of the English Language; Second Edition; Unabridged; pp. 1414, 1431.

*Primary Examiner*—R. B. Penland
*Attorney, Agent, or Firm*—Bell, Seltzer, Park & Gibson

[57] ABSTRACT

Solid lipid pellets containing 65% to 95%, or higher, lipid concentration suitable for use in or as animal food supplements and/or feed rations wherein: a mixture containing at least water and an edible algin-like coagulant is formed in a mixing chamber (11,12); a liquified lipid is added to form a gel-like algin/water/lipid emulsion; and, the emulsion is deposited in discrete quantities (30) into a metal ion bath (29) causing the emulsion to "set" in a lipid pellet integral and solid throughout its entire structure. The lipid pellets may be packaged for delivery to points of consumption and/or admixed with other feed materials to form nutritive animal feed rations. Small amounts of ammonia and/or bentonite may be added to the aqueous mixture to increase the lipid adsorptive capacity thereof. One exemplary system (10) includes: a predistributor chamber (18); distributor(s) (24,25); a positive displacement pump (22); a tank (28) containing a setting bath (29) and defining forming and firming chambers (31,32); a rotary perforate cylinder (36) having a helical flight (38) for removing firmed pellets (30); and, a setting bath recirculator (35). Modified distributors (40) include specially shaped blades (46,46') having pie-shaped blade segments (46a–46d, 46a'–46d') and complementally shaped intra-blade segment openings for forming pellets of uniform size and shape.

8 Claims, 2 Drawing Sheets

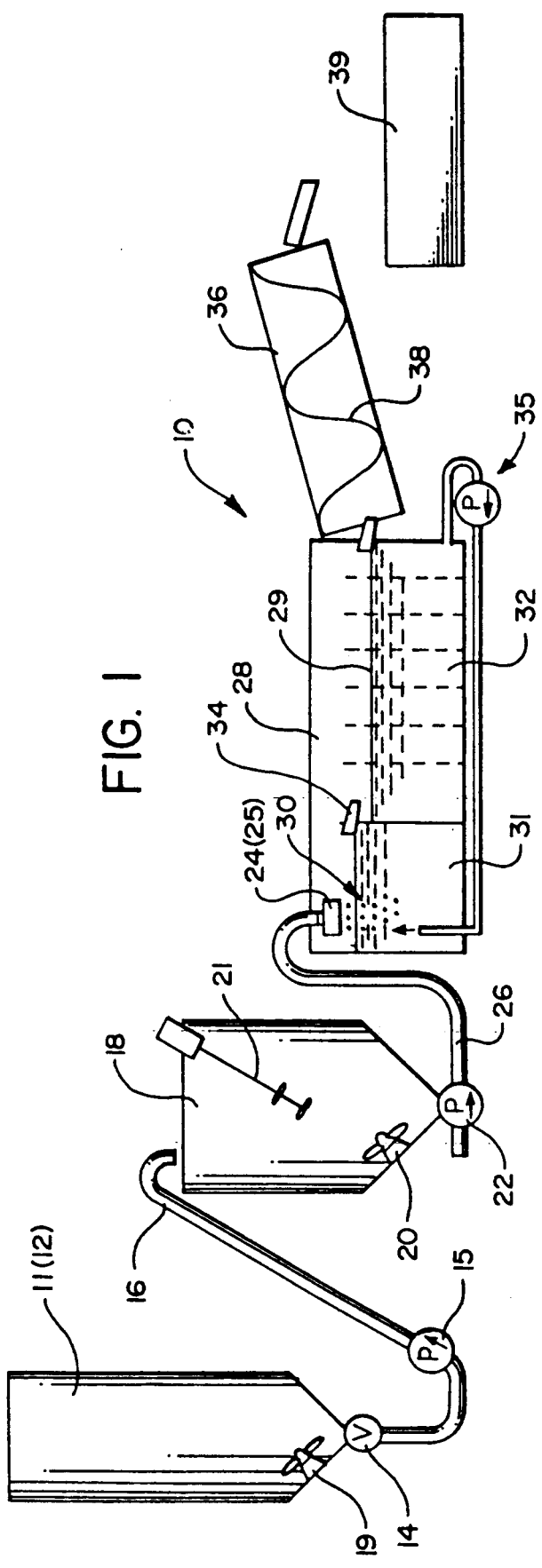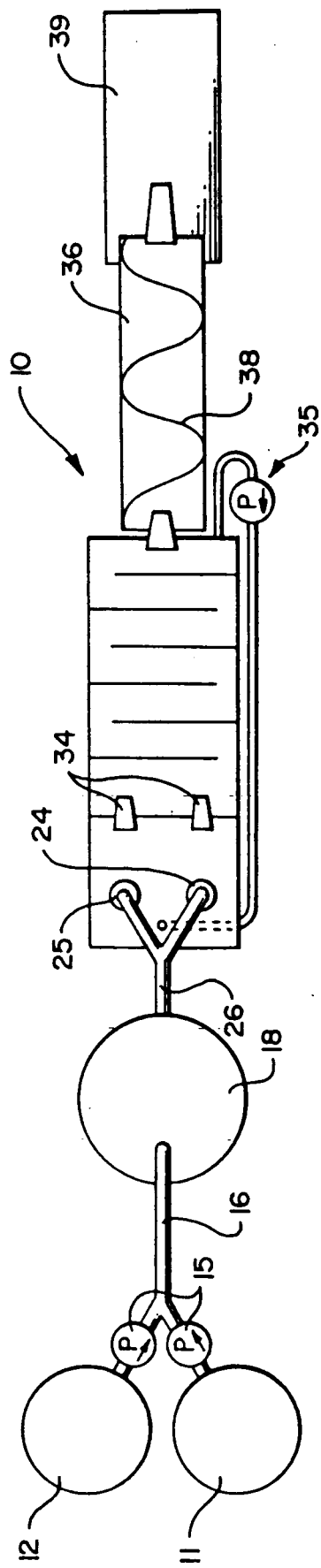

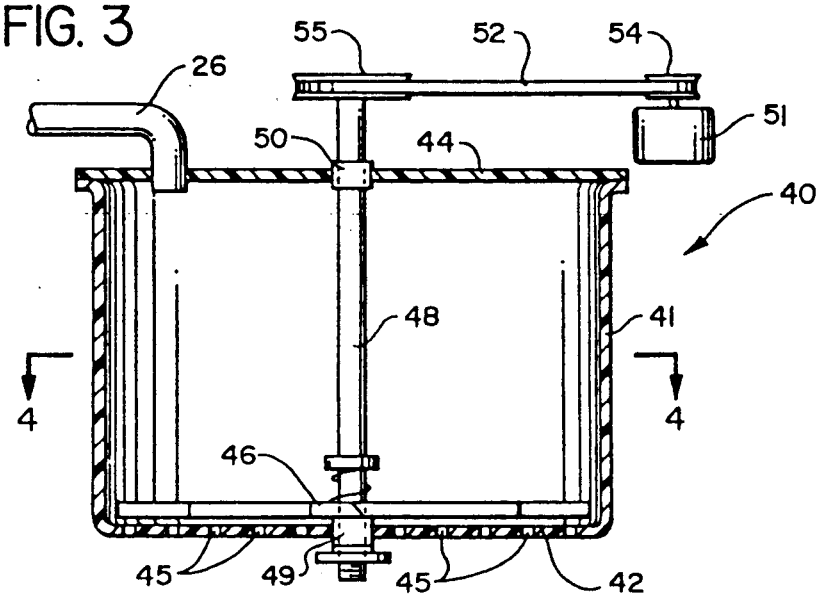
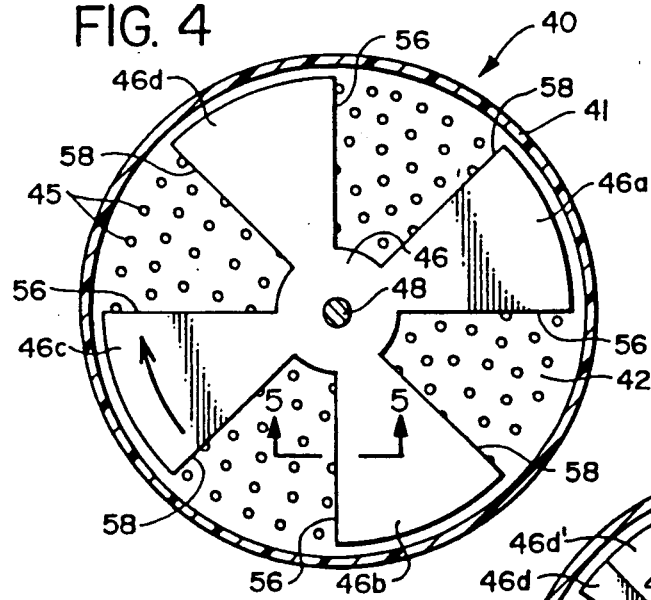
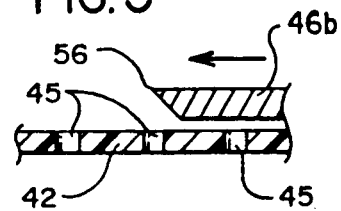
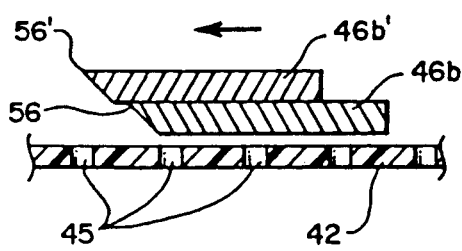
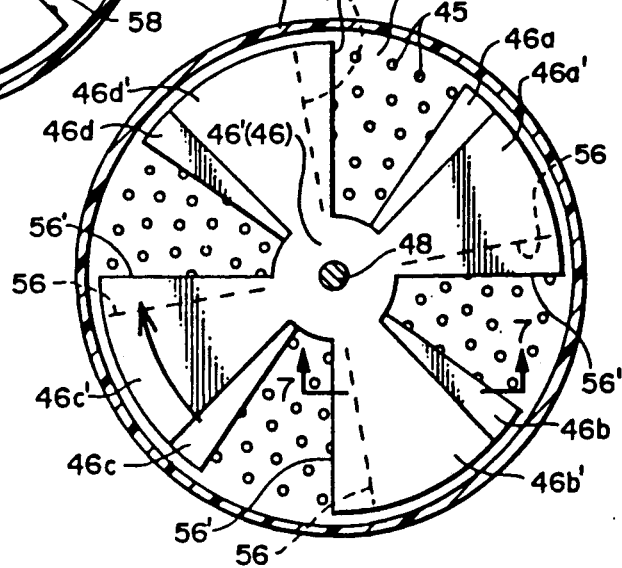

LIPID PELLETIZATION METHODS, APPARATUS AND PRODUCTS

Related Applications

The present application is a continuation of application Ser. No. 06/609,541 filed Nov. 29, 1983 by James P. Cox for "Lipid Pelletization Methods, Apparatus and Products, (now abandoned). In turn, application Ser. No. 06/609,541 is a continuation-in-part of two applications: (i) Ser. No. 06/447,622 filed Dec. 7, 1982 by James P. Cox for "Lipid Pelletization Methods and Apparatus, Pelletized Lipids, and Lipid Feed Products, and Products Incorporating Same" (now abandoned); and (ii) Ser. No. 06/447,130 filed Dec. 6, 1982 by James P. Cox for "Method and Apparatus for Forming Shaped Artificial or Simulated Edible Products" (also abandoned). In turn, Ser. No. 06/447,622 is a continuation-in-part of Ser. No. 06/193,434 filed Oct. 3, 1980 by James P. Cox for "Method for Forming Shaped Simulated Edible Products Suitable for Human and/or Animal Consumption or as Baits For Marine Creatures, and Simulated Edible Products Produced Thereby," now U.S. Pat. No. 4,362,748; and Ser. No. 06/447,130 is a divisional of Ser. No. 06/193,434.

BACKGROUND OF THE INVENTION

1. Technical Field

The present invention relates generally to methods and apparatus for pelletizing lipids—such, for example, as animal and/or vegetable based fats, oils and greases—to form essentially "dry", discrete, integral lipid particles or pellets that may readily contain any desired percentage of pure, or essentially pure, lipids ranging up to, and in some instances in excess of, from 95% to 99% lipid materials less water of hydration; yet which are "dry", firm, solid, and easily handled—i.e., they do not bleed or otherwise exude lipids in liquid form and, consequently, do not exhibit an "oily" feel; are characterized by their stability and which are not subject to rancidity; and, which can, therefore, be readily mixed in any desired proportions with other feed products for animal consumption by, for example, ruminants, fowl, birds, fish, swine, canine and feline pets, etc.

More specifically, the invention permits the formation of discrete, "dry", solid pellets and/or particles of such lipids as: (i) rendered and unrendered materials; (ii) processed or unprocessed restaurant grease—i.e., yellow grease comprised of animal fats, vegetable oils, and/or mixtures thereof; (iii) bleachable fancy tallow; (iv) hydrogenated beef tallow; (v) "special" tallow; etc., which, while they may contain from 0%, or slightly more than 0%, to 30% or more moisture, exclusive of water of hydration, are integral or solid throughout their entire structure, are pourable and free-flowing, and exhibit the external characteristics of dryness and firmness that permit such pellets or particles to be easily handled from the point of origin thereof to a point of use, and to then be incorporated in any desired proportion with animal feed rations, range blocks, or the like without risk of rancidity, clumping, agglomeration or other non-uniform distribution because of the firm, "dry"—i.e., non-oily or non-greasy—surface texture of the pellet or particle. The pellets or particles are essentially temperature insensitive—i.e., they will not readily melt nor are they damaged by freezing, although excessive heat or cold does tend to reduce the moisture content—and, they may be formed in virtually any desired shape. Moreover, because the pellets or particles comprise lipids in integral dry form throughout the entire pellet or particle structure, they may be readily admixed with feed grains without being warmed; and, then pelletized in conventional feed mills to form solid pelletized animal feed rations containing up to on the order of 15%, or more, lipids.

In its more detailed aspects, the invention readily permits the incorporation of a wide range of optional additives with the lipid materials without affecting the pelletization process and/or the foregoing characteristics of resulting pelletized products such, merely by way of example, as: mineral supplements; nutrients; vitamins; medicants including antibiotics and/or antifungals; antioxidants; preservatives; etc. In a modified form of the invention, the pelletized lipids can readily serve as biodegradable controlled-time-release carriers for: pesticides—e.g., attractants or repellants which may be formed as pest control scatters; herbicides; fertilizers; hormones and/or growth nutrients; dust control scatters; deodorants; etc.

2. Background Art

The value of fats, oils (other than essential oils), and greases (other than hydrocarbon and/or petroleum based materials), herein generically referred to as lipids, as a nutritional feed supplement for virtually the entire gamut of the animal world including ruminants, swine, fowl, canine or feline pets, fish, birds, etc., has long been recognized. Unfortunately, however, the very nature of such lipids, which are commonly in liquid form or which exude or bleed liquified oil and/or grease exudates, particularly at elevated temperatures, has served to minimize their mass distribution and/or use as a feed supplement. Thus, the tendency of lipids to become rancid and spoil when subjected to oxidants serves to impose severe limitations on the shelf life of dry feed products incorporating such lipids. Moreover, lipid materials, when admixed with grain and similar dry feed products, are not only subject to rancidity but, in addition, they are temperature sensitive, tend to clump or otherwise agglomerate, and to disperse non-uniformly through such conventional feed products; and, consequently, they create severe packaging and handling problems. A typical, but not exclusive, problem area has been the inability to incorporate lipids as a nutritional feed supplement for range fed ruminants because, for example, efforts to incorporate lipids in any meaningful amounts in range blocks have been unsuccessful since the lipid materials tend to bleed out of the range block and to thereafter be subjected to oxidation, rancidity and spoilage, thus destroying the nutritive value of the remaining range block ingredients, rendering the range blocks difficult to handle and, indeed, often causing the range blocks to become soft and pliable, and to collapse or otherwise disintegrate.

Prior to the advent of the present invention, the foregoing problems have continued to plague the industry despite extensive expenditures of time and money in attempts to resolve the problems and to provide a system suitable for widespread mass distribution of lipid-type food supplements. Research directed to attempts to provide solutions to the problems has been conducted and/or sponsored by a wide range of institutions including, for example, the Fats And Proteins Research Foundation, Inc. of Des Plains, Illinois, as well as at innumerable university based research facilities, principally in the agricultural fields. For example, it has been known for years that lipids can be absorbed in a wide variety of edible absorbant host carriers or support matrices such as rice, puffed rice or wheat, wheat middlings, wheat bran, beet pulp, alfalfa meal, corn cobs, bees wings, edible clays or earths, etc. See, for example: Robison, U.S. Pat. No. 1,997,083 (oil treated bird seeds and other cereal products); Clayton, U.S. Pat. No. 2,991,178 (oil treated beans and seeds); Lewis, U.S. Pat. No. 3,257,209 (soybean oil meal); Pruckner et al, U.S. Pat. No. 3,340,065 (fat containing edible bleaching earth); and, Hoffman, U.S. Pat. No. 3,620,755 (soybean meal impregnated with edible oleaginous materials and cooked in boiling water). Unfortunately, the foregoing approaches, and many similar approaches contemplating the impregnation of an edible host carrier, have not met with acceptance or widespread commercial usage for a wide variety of reasons. For example, the host carrier itself renders the product suitable for use on a highly limited species-specific basis. The problems of stability, rancidity, temperature sensitivity, and mess in handling resulting from exudates, remain. The carrier itself often comprises substantially in excess of 50% of the weight and bulk of the thus treated feed product, not only limiting the amount of nutritional lipid values that can be fed to various types of animals but, also, significantly increasing the cost of distribution. The resulting impregnated carriers often have wet or oily surface coatings and are generally not free-flowing. Moreover, many of such carriers—for example, rice—are simply too expansive to permit widespread usage as animal feeds.

Another approach has involved relatively expensive and highly complex processes for converting fat or similar lipids to powdered dry form. Typical of this approach are the systems disclosed in Campbell, Jr. et al, U.S. Pat. No. 3,514,297, Grolitsch, U.S. Pat. No. 3,892,880, and Nappen, U.S. Pat. No. 4,232,052. However, such powdered lipid products are prohibitively expensive for use as an animal food supplement.

In the mid-1970's, the widespread research and experimentation then underway led to the purported "solution" disclosed in Scott et al, U.S. Pat. No. 3,925,560 and in Rawlings et al, U.S. Pat. No. 4,042,718. Thus, in these patents, the patentees disclose systems wherein lipids are encapsulated in protective protein-aldehyde complex coatings to produce concentrated high fat, dried, particulate, free-flowing compositions. While the efforts of Scott et al and Rawlings et al, for the first and only time prior to the advent of the present invention, produced "dry pellets" or particles characterized by a high lipid content which were contemplated as having utility for animal feed products, unfortunately the systems have met with no commercial acceptance because, if for no other reason, the aldehyde constituent was, and is, a known carcinogen and, consequently, the resulting product was not, and cannot be, approved for use as an animal feed supplement.

In U.S. Pat. No. 4,216,234, Rawlings et al disclose a particulate composition formed by a dispersion or emulsion of globules of nutrient lipids within an aqueous albumin containing medium which is thereafter formed into a gel and dried to form the composition—an arrangement characterized by a relatively low percentage of lipid content within the particulate product. In U.S. Pat. No. 4,217,370, Rawlings et al disclose a process for making lipid-containing foodstuffs comprising solubilizing particulate proteinaceous matter, admixing a lipid material so as to form an emulsion, and contacting the emulsion with an effective amount of a pH adjusting agent to lower the pH to its isolectric point, thereby aggregating the protein and simultaneously microencapsulating the lipid. Again, the fat content of the resulting product tends to be relatively low. Moreover, both approaches are technically complex from a production standpoint, prohibitively expensive, present severe potential bacterial problems and, indeed, can result in products having carcinogenic properties.

Many prior art patents can be found which relate in general to the formation of gelatinous food products by the interaction of alginates with various metal salts and, particularly, with salts of calcium such as calcium carbonate. Typical of these patents are: Steiner, U.S. Pat. No. 2,441,729; Gibsen, U.S. Pat. No. 2,918,375; Freedman, U.S. Pat. No. 3,349,079; and, Miller et al, U.S. Pat. No. 3,455,701. In general, these patents disclose relatively slow gelation processes which generally require on the order of ten minutes for the calcium solution to cause the alginate to form a soft gel. A similar disclosure appears in an article authored by T. R. Andrew and W. C. MacLeod, *Application And Control Of The Algin-Calcium Reaction*, FOOD PRODUCT DEVELOPMENT, August-September 1970, at pp. 99, 101, 102 and 104. In this article, the authors discuss the formation of various types of artificial food products using a sodium alginate solution which can be slowly gelled by dispersion in an aqueous calcium salt solution or which can be instantaneously gelled by dispersion into a 10% solution of calcium chloride. It is stated that a mixture of an algin syrup with sugar, colorings, flavors, etc., can be deposited in a calcium chloride bath " . . . to form spheres which look like fruit or vegetable pieces . . . " or " . . . caviar . . . " (p. 104). None of the foregoing relate, however, to systems intended for or capable of pelletizing lipids.

In Peschardt, U.S. Pat. No. 2,403,547, the patentee proposes forming a viscous solution comprising 100 parts by weight of water, 20 parts by weight of glucose, and sodium alginate comprising from 1% to 2% by weight of the final solution, to which any desired optional colorings or flavorings may be added. To make spheroidal-shaped objects such as "cherries", the patentee proposes extrusion of the foregoing basic stock as "detached blobs" from extrusion nozzles into an aqueous solution of calcium chloride which is stated can range from " . . . as little as 1% or 3% or as much as 10% or more calcium chloride in the setting bath . . . " (Col. 2, ll. 44-46). Peschardt further suggests that shapes and forms other than spheroidal can be obtained by charging the basic alginate stock into mold recesses, and then depositing the pre-molded shapes of viscous stock into the setting bath. There is no teaching in Peschardt of the use of lipid ingredients.

Although the use of algin-like coagulants to form dry, stable, discrete, solid pellets or particles containing high concentrations of lipids has not heretofore been contemplated, it has long been recognized that algins are suitable for use as barrier layers in forming gel-like lipid emulsions that can be utilized as a part of a complex overall mixed ingredient system in a wide range of food analogs. Such systems are disclosed in, for example, Hawley, U.S. Pat. No. 3,658,550 wherein an artificial adipose tissue is produced by reacting an aqueous solution of an alkali salt of alginic acid and a retarding agent with a fat dispersion of an alkaline earth metal salt to form an alginate gel matrix with the liquid fat entrapped therein in small discrete droplets or globules which are then slowly released by rupture of the walls enclosing the droplets during cooking to baste a simulated analog meat product—i.e., the alginate/meat matrix comprises a honeycomb-like structure containing fat entrapped in the interstices of the honeycomb-like matrix.

Similarly, Feldbrugge et al, U.S. Pat. No. 3,919,435 discloses a meat analog formed from a vegetable protein gel precursor that has incorporated therein animal fatty tissue and/or vegetable oil with a thermostable, polymeric carbohydrate gel. In this disclosure, as in Hawley, supra, fat is employed simply as one ingredient in an overall meat analog system; and, there is no disclosure for, nor intention of, forming integral, discrete, dry, solid, lipid particles or pellets, per se. Algin, in effect, simply forms a barrier between protein and fat fractions in a meat analog containing on the order of only 5% to 30% by weight of fat and/or vegetable oil.

Other similar disclosures are found in: Kofsky et al, U.S. Pat. No. 3,862,336 which discloses an animal food product comprising a dried proteinaceous food substance, an aqueous matrix including a water soluble colloidal binding and gelling agent, and a water soluble, low molecular weight, solid, liquid, or mixture thereof, and which can contain relatively low concentrations of fat; and, Baugher, U.S. Pat. No. 4,098,913 which contemplates the formation of regularly shaped gelled fat particles made by admixing a triglyceride fat or oil and a gelling agent which is then heated and cooled while being agitated to form gelled particles that can be incorporated into meat analogs.

Other patents of general interest include: Strums et al, U.S. Pat. No. 3,991,224 (a whipped food product and process for forming the same); Goryaev et al, U.S. Pat. No. 4,007,248 (a dried fat emulsion concentrate); Schroeder et al, U.S. Pat. No. 4,027,043 (an animal feed supplement in solid, range block form and said to contain fats); British Pat. No. 586,157 (a process for forming simulated fruit and the like from alginates); French Pat. No. 874,977 (an alginate based gel emulsion to form spreadable food analogs); and, French Pat. No. 2,087,852 (an alginate based fruit skin analog and an encapsulated oil-in-water emulsion—i.e., a liquid emulsion within an outer capsule formed of algin—suitable when ruptured for basting meat).

Still other patents of miscellaneous interest pertaining to alginate based compositions and processes for making food products and the like, but which do not contemplate any significant, if any, lipid content, include: U.S. Pat. No. 2,809,893-Poarch et al; U.S. Pat. No. 2,965,498-Hartwig et al; U.S. Pat. No. 2,973,274-Langmaack; U.S. Pat. No. 3,060,032-Glicksman; U.S. Pat. No. 3,362,831-Szezesniak; and, U.S. Pat. No. 3,650,766-Smadar.

In general, it has been found that despite the efforts of a large number of researchers over a prolonged period of time, as exemplified by the foregoing publication and patents, prior to the advent of the present invention no simple, economical system has been developed for delivering a lipid, per se, or high lipid concentration particles, in integral, dry, solid, highly concentrated and stable form to points of use where the lipid can be admixed uniformly in any desired proportion with virtually any type of animal feed product, or where it can be incorporated in otherwise conventional pelletized feed rations containing grain or the like, or where it can be fed to animals by itself, all so as to meet the nutritive requirements of the particular animals in question Indeed, except for the encapsulated protein/lipid/aldehyde disclosures in Scott et al, U.S. Pat. No. 3,925,560 and Rawlings et al, U.S. Pat. No. 4,042,718, neither of which is suitable nor approved for use as an animal feed supplement because the aldehydes employed therein are known carcinogens, none of the prior art approaches have dealt specifically with the need to develop a highly concentrated, integral, solid, dry, lipid pellet per se, enabling lipids to be delivered to a point of use in stable, dry form on a cost-effective basis. Thus, despite all of the foregoing efforts, the "state of-the-art" as it exists at the present time is perhaps best described in the DIRECTOR'S DIGEST, a publication issued by J. D. Schroder, Technical Director, for the Fats And Proteins Research Foundation, Inc. ("FPRF") in Des Plaines, Illinois, the September 1982 issue, No. 152, wherein it is stated:

"... Thus far, there have been no breakthroughs in the development of a low-cost, dry fat product. We have followed up on the work that Dr. Boehme did in identifying suitable carriers and have obtained cost figures which will be helpful in considering a product or products to manufacture.

"The number of suitable carriers for fat is quite limited since absorbability characteristics are not the same as for water-based materials such as molasses. To complicate the situation, some products may be suitable for certain markets, while unsuitable for other markets.

"The potential fat carriers, which we have worked with or are familiar with, can be classified as either nutritional or non-nutritional. They are listed below in terms of fat-carrying capacity, price and applicable markets.

| "INGREDIENT | F.O.B. PRICE/ CWT. $ | FAT CARRYING CAPACITY | MARKET |
| --- | --- | --- | --- |
| Nutritional | | | |
| Puffed rice or wheat | $50.00 | 75–80% | All Species |
| Wheat middlings | 4.50 | 30–35% | All Species except broilers |
| Wheat Bran | 4.50 | 40% | Cattle & Sows |
| Beet Pulp | 6.50 | 30–40% | Cattle |
| Alfalfa Meal | $4.00–7.50 | 30% (est.) | All Species except broilers |
| "Non-Nutritional | | | |
| Verxite (expanded mica) | $21.00 | 70% | Cattle |
| Corn cob flour | 5.50 | 50% | Cattle & perhaps swine |
| Bentonite | 2.50 | 20% | Cattle ... " |

The foregoing FPRF publication goes on to point out many of the disadvantages in terms of transportation costs, low fat content, excessively high costs for higher fat content carriers, and species-specific applications for their use. Thus, despite all of the efforts and expenditures in time and money during the past two decades or more, the present "state-of-the-art" for delivery of lipid food supplements for animals contemplates the impregnation of a host carrier that may or may not have nutritional value and which significantly contributes to the bulk, weight and delivery costs of the feed. And, at the same time, problems of rancidity and difficulty in handling persist.

SUMMARY OF THE INVENTION

Integral, firm, solid, "dry" pellets or particles of lipids, per se, containing on the order of about 65% to 70% lipids and 30% to 35% moisture, and ranging up to 95% to 99%, or higher, lipid concentrations, less water of hydration, with attendant reduction of moisture content, suitable for use in a wide range of applications including, but not exclusively limited to, the particularly advantageous application of dry lipid animal food supplements, per se, together with methods and apparatus for forming such lipid pellets or particles, and various feed rations including such dry lipid pellets or particles, are disclosed wherein: (i) a suitable aqueous mixture containing at least water and an edible algin-like coagulant is formed and preferably heated or maintained at a temperature level above the level at which the particular lipid to be processed exists in a liquid phase; (ii) the liquid or liquified lipid is then added to the aqueous mixture so as to form a gel-like algin/water/lipid emulsion which is continuously agitated to form a homogeneous gel-like emulsion; (iii) the gel-like emulsion is thereafter extruded or otherwise deposited in discrete particulate form and in any desired discrete configuration or shape into a suitable metal salt bath such, for example, as a calcium chloride ($CaCl_2$) ion bath, which causes the algin/water/lipid emulsion to "set" in a desired configuration with the resulting pellet or particle comprising an integral, solid, lipid particle throughout its entire structure and having a moisture content essentially equal to the ratio of water to the lipid introduced into the aqueous mix; (iv) the resulting pellet or particle is maintained in the metal salt or ion bath for a sufficient length of time to insure desired firmness of the product; and, thereafter, the lipid pellets or particles formed may be: (v) packaged, with or without optional drying to further decrease the moisture content, for delivery to subsequent points of use; and/or (vi), further processed by admixture with other feed materials to form desired animal feed rations containing a preselected level of lipid nutrients. In one of its preferred forms, the invention contemplates: (i) the addition of small amounts of ammonia ($NH_3$) to the aqueous mixture for rendering the constituent ingredients of the lipid/water system more compatible, for enhancing the emulsifying properties of the algin-like coagulant, and for extending the capacity of the coagulant and therefore reducing the amount of coagulant required; and/or (ii), the addition of bentonite or other suitable solubilized coagulant expanders to increase the lipid absorptive capacity of the aqueous coagulant matrix.

In its more detailed aspects, the invention contemplates the addition of optional additives such as mineral supplements, vitamins, blood, yeast, fish oil, preservatives, medications including antibiotics and/or antifungals, antioxidants, visual attractants such as dyes, olfactorily enticing additives, gustatatory enticing flavors, and the like, to meet species-specific nutrient feed requirements. In a modified form of the invention, the aqueous coagulant/lipid mixture may contain suitable pesticides—e.g., attractants or repellants which may be formed as pest control scatters—herbicides, fertilizers, hormones and/or other growth nutrients, deodorants, or the like, so as to provide a biodegradable, controlled-time-release carrier for such additives.

Accordingly, in one of its principal aspects, it is an object of the invention to overcome all of the disadvantages inherent with prior art approaches and to provide a means for delivering lipids, per se, in "dry", stable, particulate, solid form, and to provide methods and apparatus for forming such products, on a simple cost-effective basis that permits the mass production of dry pellets or particles of such lipids, either with or without additives, and wherein the resulting product is temperature insensitive, not subject to rancidity or spoilage, and is "dry" in the sense of being an integral, uniform structure throughout which does not readily exude lipids and has a firm, non-oily surface texture. As a result of attaining the foregoing objective, lipid pellets or particles produced in accordance with the present invention can be readily and uniformly mixed with a wide range of dry animal feeds and mixtures thereof, and subsequently bagged or otherwise packaged for delivery to end users without fear of clumping, agglomeration, rancidity, and/or damage to the packaging materials resulting from liquid lipid exudates.

In another of its important aspects, it is an object of the invention to provide an aqueous coagulant/lipid system which permits the formation of dry lipid pellets or particles having lipid/moisture ratios on the order of up to as much as 65% to 70% lipids to as little as 35% to 30% moisture, or even higher lipid concentrations if desired. In this connection, it is an object of the invention to provide an aqueous coagulant/lipid system characterized by its ability to output dry lipid pellets or particles having lipid concentrations on the order of 65% to 70% without the need for subsequent drying; yet, wherein the lipid concentrations can be further increased by drying in atmospheric air or with the use of suitable conventional heaters to further reduce the moisture content. Moreover, when mixed with dry grains, the pellets or particles tend to further dewater until the water of hydration level for the grains reaches its normal level. As a consequence of attaining this objective, the invention minimizes costs in distribution of pellets or particles having high lipid concentrations, and permits of subsequent pelletization of feed grains and the like having solid, dry, lipid pellets therein utilizing conventional feed mills so as to form discrete pelletized animal feed rations having virtually any desired concentration of lipids contained therein—for example, where dietary considerations comprise the controlling factor, the discrete pelletized animal feed rations may contain up to on the order of 15%, or more, lipids by weight. Moreover, the structure of the lipid pellet or particle readily permits incorporation thereof in range blocks without fear that the lipids will bleed or form liquified lipid exudates that will cause the range block to disintegrate and/or spoil.

Because of the biodegradable nature of the resulting dry pelletized lipid, per se, such pellets may readily serve as controlled-time-release carriers for pesticides—e.g., attractants or repellants which may be in the form of pest control scatters—herbicides, fertilizers, hormones and/or growth nutrients, deodorants, and the like, and permit of ease in widespread broadcasting thereof since they do not tend to clump, agglomerate or otherwise adhere to one another or to foul mechanical distribution systems.

DESCRIPTION OF THE DRAWINGS

These and other objects and advantages of the present invention will become more readily apparent upon reading the following detailed description and upon reference to the attached drawings, in which:

FIG. 1 is a diagrammatic side elevational view, substantially in block-and-line form, here illustrating a typical system and apparatus which may be employed for forming dry, solid, lipid pellets in accordance with the present invention;

FIG. 2 is a plan view, again in diagrammatic block-and-line form, of the system shown in FIG. 1;

FIG. 3 is an enlarged, diagrammatic, vertical, sectional view here illustrating details of a modified type of distributor also embodying features of the present invention and which can be utilized to form pelletized lipids wherein the discrete pellets formed are characterized by their uniform size and shape;

FIG. 4 is a plan view taken substantially along the line 4—4 in FIG. 3 and here illustrating details of one exemplary type of distributor blade that can be utilized with the present invention to force a gel-like emulsion through the distributor outlet ports or holes in a perforate wall of the distributor for extruding discrete globules of emulsion containing essentially equal quantities of material;

FIG. 5 is an enlarged, fragmentary, sectional view taken substantially along the line 5—5 in FIG. 4, here illustrating details of the leading edge of the blade segment on a distributor blade which enables extrusion of gel-like emulsion through the distributor outlet holes under high pressure;

FIG. 6 is a plan view similar to FIG. 4, here illustrating a modified form of the invention employing a pair of similar distributor blades mounted one on top of the other, but with the uppermost blade having its leading edges offset slightly (in the direction of rotation) from the leading edges of the lowermost blade segments so as to form a preloading distributor blade arrangement which is highly advantageous when working with relatively viscous gel-like emulsions; and, FIG. 7 is a sectional view similar to FIG. 5, but here taken substantially along the line 7—7 in FIG. 6.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and alternatives falling within the spirit and scope of the invention as expressed in the appended claims.

DETAILED DESCRIPTION

Environment Of The Invention

Turning to FIGS. 1 and 2 conjointly, there has been illustrated, in highly diagrammatic form, an exemplary system, generally indicated at 10, for forming dry, solid, lipid pellets in accordance with the present invention. Thus, as here shown, the exemplary system 10 includes a pair of premixing chambers 11, 12 for receiving the aqueous coagulant/lipid mixture and for maintaining the same in a homogeneous semi-liquid or gelled emulsion form, together with suitable valves 14, pumps 15 and conduits 16 for delivering the gel-like emulsion from one or the other of the premix chambers 11, 12 to a predistributor chamber 18. A suitable agitator 19 is provided in each of the premix chambers 11, 12, while a pair of agitators 20, 21 are mounted within the predistributor chamber 18, for continuously mixing the aqueous coagulant/lipid emulsion and maintaining the ingredients in a homogeneous gel-like emulsion form. Although not illustrated in the drawings, the premix chambers 11, 12 and predistributor 18 may be provided with any suitable conventional means for heating the contents and maintaining the lipids at temperature levels above the level at which the lipid may solidify—for example, when the lipid comprises yellow grease which becomes liquid at about 85° F., the ingredients are preferably kept at temperature levels on the order of about 98° F. or even up to on the order of 130° F.

In order to form discrete particles or pellets of lipid materials, the coagulant/lipid gel-like emulsion is withdrawn from the predistributor chamber 18 by means of a conventional piston-type positive displacement pump 22 which serves to meter measured quantities of the gel to a pair of distributors 24, 25 via conduits 26. The distributors 24, 25 are, in this exemplary form of the invention, disposed in or above a tank 28 which contains an ion bath 29 preferably formed of an aqueous calcium chloride ($CaCl_2$) solution containing on the order of 0.1% to about 3% or 4% calcium chloride in a water solution. Alternatively, while not shown in the drawings, the distributors 24, 25 may be positioned beneath the surface of the ion bath 29 and continuous extrusions therefrom may be separated beneath the surface of the bath by, for example, apparatus of the type more fully described in applicant's prior U.S. application Ser. No. 193,434, filed Oct. 3, 1980, now U.S. Pat. No. 4,362,748, and/or in applicant's copending U.S. application Ser. No. 447,130, filed Dec. 6, 1982.

Thus, dependent upon the size and shape of the openings (not shown) in the distributors 24, 25, the amount of coagulant/lipid gel-like emulsion metered therein by the positive displacement piston-type pump 22, and/or the location of the distributors, a plurality of pellets or particles, generally indicated at 30 in FIG. 1, are extruded into the calcium chloride bath 29 where calcium ions react with the algin/lipid emulsion to "set" the pellet or particle in a relatively firm, solid pellet-like or particle configuration. That is, the calcium/algin reaction serves to cross-bond the calcium and algin, rendering the algin—which theretofore had been water soluble—water insoluble. Those skilled in the art will readily appreciate that by carefully controlling the size and/or shape of the outlets in the distributors 24, 25, and/or the stroke of the piston in the positive displacement pump 22, and/or the location of the distributors, the amount of emulsion extruded can be controlled to form small, pellet-like, spherical, or substantially spherical, shapes or elongated maggot-like, worm-like or noodle-like shapes.

In carrying out the present invention, the tank 28 is preferably divided into a first pellet or particle forming chamber 31 disposed immediately beneath the distributors 24, 25 and a second labyrinth like firming chamber 32 which is shaped and dimensioned to maintain the pellets within the calcium chloride bath 29 for a sufficient length of time—here, preferably in a range of from on the order of at least one minute to about fifteen minutes—to insure adequate firming and setting of the product. For example, where the coagulant/lipid gel-like emulsion includes bentonite and ammonia as hereinafter described in connection with Example I and is extruded as discrete particles in a 1% calcium chloride ($CaCl_2$) ion bath, it has been found that excellent results are attained when the pellets have a residence time within the ion bath 29 on the order of about six to seven minutes. The arrangement is such that the pellets formed in chamber 31 tend to float on or near the surface of the calcium chloride bath 29 and they are carried by the recirculating flow of the calcium chloride bath over or through weir defining means 34 into the labyrinth firming chamber 32. Such movement of the particles or pellets is aided by providing a recirculating system, generally indicated at 35, for removing the calcium chloride solution from the labyrinth firming chamber 32 at the downstream end thereof and reintroducing the calcium chloride solution into the pellet forming chamber 31 in a generally upwardly extending direction so as to promote fluid movement and floating of the pellets or particles.

In keeping with the present invention, the pelletized or particulate "set" and solid lipid particles are removed from the downstream end of the labyrinth firming tank 32 and introduced directly into a rotary perforate cylinder 36 containing an integral, imperforate, helical flight 38 extending therethrough. Thus, as the pellets transit the cylinder 36, excess calcium chloride solution is separated therefrom and returned to the recirculation system 35 through any suitable means (not shown). The finished pellets or particles may be passed to a separate dryer (not shown) or, alternatively, they may be subjected to drying within the rotatable cylinder 36. In either case, the appropriately dried pellets can be delivered to a suitable tote 39 or, alternatively, to either suitable packaging or bagging equipment (not shown) or for further processing including, but not limited to, systems for mixing the pelletized lipids with other feed materials.

Those skilled in the art will appreciate that a wide variety of different types of emulsion distribution systems can be employed in carrying out the methods of the present invention and for producing the various products herein described. Thus, while use of the exemplary positive displacement piston-type pump 22 for delivering metered quantities of emulsion to the distributors 24, 25 and, therefore, for extruding metered quantities of the emulsion through the distributor outlet ports (not shown), has proven highly effective in the practice of the invention, other material handling/distribution systems have also been successfully employed. For example, as more fully described in applicant's prior U.S. application Ser. No. 193,434, filed Oct. 3, 1980, now U.S. Pat. No. 4,362,748, and/or in applicant's copending U.S. application Ser. No. 447,130, filed Dec. 6, 1982, a rudimentary type of distributor that has been successfully employed utilizes simply a first vat or container having a perforate bottom wall disposed above a setting bath contained within a second container. The arrangement is such that the emulsion introduced into the first container is permitted to drip through the openings in the perforate bottom wall thereof into the setting bath; and, by suitably controlling the viscosity the emulsion, the quantity of emulsion within the first container, the size of the holes in the perforate bottom wall, and/or the spacing between the perforate bottom wall and the surface of the setting bath in the second container, pellets of a desired size and/or shape can be produced. This rudimentary type of emulsion distribution system is, of course, characterized by its simplicity and economy, requires no pumps (with the possible exception of pumps that may be employed to deliver emulsion to the first container), no moving parts and, therefore, virtually no maintenance.

Yet another type of emulsion distribution system that can be, and has been, successfully employed utilizes one or more enclosed emulsion distributor chambers including provisions for charging or loading the chamber(s) with the water/coagulant/lipid emulsion, distributor openings in the chamber(s), and any suitable means for incrementally or momentarily pressurizing the chamber(s) to force metered discrete quantities of the emulsion through the distributor openings.

Turning now to FIGS. 3 through 5, there has been illustrated yet another type of exemplary distributor, generally indicated at 40, embodying features of the present invention and which has been found highly advantageous for forming pellets characterized by their uniform size and shape; and, which can readily be employed in lieu of the distributors 24, 25 and positive displacement pump 22 shown by way of example in FIGS. 1 and 2. Thus, as best shown in FIG. 3, each distributor 40 comprises a housing 41 having a perforate bottom wall 42 and into which the gel-like water/coagulant/lipid emulsion formed in the pre-distributor chamber 18 (FIGS. 1 and 2) is introduced via an inlet conduit 26. A removable support element, which may conveniently comprise a closure or lid 44, is separably mounted on the upper end of the distributor housing 41. In order to insure positive extrusion of the gel-like emulsion through a plurality of distributor openings 45 formed in the perforate bottom wall 42, the exemplary distributor 40 includes a distributor blade 46 mounted on a shaft 48 rotatably supported in bearings 49, 50 respectively mounted in the perforate bottom wall 42 of the distributor and the support element 44. Any suitable power source—for example, a motor 51—is coupled to the shaft 48, for example, by means of a drive belt 52 trained about a drive pulley 54 on the output shaft of motor 51 and a driven pulley 55 nonrotatably mounted on the upper end of the distributor blade supporting shaft 48.

In carrying out this aspect of the invention, and as best illustrated in FIG. 4, the distributor blade 46 includes a plurality of blade segments—here, four (4) such blade segments 46a–46d are shown by way of example—each of which comprises a pie-shaped segment having its truncated apical end integral with the central hub portion of blade 46. Preferably, the distributor blade 46 is designed and configured such that the blade segments 46a–46d are spaced apart from one another by pie-shaped openings which are equal in size and shape to the blade segments 46a–46d, thereby insuring that during operation essentially fifty percent (50%) of the distributor outlet ports 45 in the bottom wall 42 of distributor 40 are exposed at all times, while the remaining fifty percent (50%) of the distributor outlet ports underlie the rotating blade segments.

Each blade segment 46a–46d includes a leading edge 56 and a trailing edge 58 which, for purposes of facilitating an understanding of the invention, are here shown as being radially oriented with respect to the axis of rotation for the blade 46 defined by shaft 48. Those skilled in the art will appreciate that the term "pie-shaped" as used herein and in the appended claims to describe the shape of the blade segments and intra-blade spacings has been employed in a non-limiting descriptive sense since a wide range of shapes can be employed provided only that the blade segments and intra-blade openings are substantially equal in size and shape and define progressively increasing circular arcs at progressively greater radial distances from the axis of blade rotation.

Thus, the arrangement is such that when the distributor blade 46 is driven at a constant velocity by motor 51, the rotational velocity of all points on each blade segment 46a-46d are equal, thereby insuring that each distributor outlet port 45 formed in the perforate bottom wall 42 of the distributor 40 is exposed for the same incremental period of time as all other outlet ports 45 irrespective of their radial distance from the axis of rotation; and, thus insuring that the same quantity of gel-like emulsion is extruded through each outlet port 45, resulting in pellets of uniform size. As indicated above, although the exemplary blade 46 shown in FIG. 4 includes blade segments 46a-46d having essentially radial leading and trailing edges 56, 58, respectively, those skilled in the art will appreciate that the leading and trailing edges need not be radial and, indeed, need not lie on straight lines provided only that the leading edge of each blade segment bears a relationship to the trailing edge of each preceding blade segment at like radial distances from the axis of rotation such that all distributor outlet ports 45 will be exposed for the same incremental period of time irrespective of their radial distance from the axis of blade rotation. This can be accomplished by make all pie-shaped blade segments and the pie-shaped spaces therebetween of equal size and shape.

In keeping with this aspect of the invention, and as best shown in FIG. 5, it will be noted that the leading edges 56 for each blade segment—for example, here blade segment 46b—is provided with a beveled undercut knife edge defining an included angle of about 45° with the upper planar surface of the blade 46. Thus, the arrangement is such that as the blade 46 is rotationally driven by motor 51 in a clockwise direction as viewed in FIG. 4, the leading edges 56 of the blade segments 46a-46d sweep across all distributor outlet ports 45; and, because of the beveled backcut knife edge formed on the leading edge 56 of each blade segment, the gel-like emulsion contained within the distributor 40 is collected under the leading edges 56 of the blade segments and is forced or extruded through the distributor outlet ports 45 under high pressure. Since the number of outlet ports 45 covered by the blade segments 46a-46d is essentially equal at all times to the number of outlet ports exposed between adjacent blades, and since the leading edges of the blade segments pass over all distributor outlet ports 45 on a uniform time interval after the holes are exposed by passage of the trailing edge of the preceding blade segment, all pellets formed by the exemplary process and apparatus will contain essentially the same quantity of gel-like emulsion and will, therefore, be of the same size and shape Those skilled in the art will appreciate that the particular dimensions employed for the various distributor components may vary widely and are not critical to the invention. However, excellent results have been achieved with gel-like emulsions of the type described in the ensuing Examples when the distributor outlet ports 45 in the distributor 40 are approximately 3/16 inches in diameter, the blade segments 46a-46d are approximately ⅛ inches thick, and the blade segment leading edges each have an included angle of about 45°. The size of the pellets formed may be readily controlled by selection of the size of the outlet ports 45, the surface area of the beveled leading blade edges 56 (which surface area is a function of the included bevel angle and the thickness of the blade segments), and the viscosity of the gel-like emulsion.

When dealing with highly viscous gel-like emulsions, it has been found advantageous to employ the modification of the invention shown by way of example in FIGS. 6 and 7. Thus, in this exemplary form of the invention, a second distributor blade 46' essentially identical to the blade 46 shown in FIG. 4 is employed with one blade on top of the other in face-to-face relation; but, wherein the leading edges 56 of the lowermost blade segments 46a-46d are offset rearwardly—i.e., in a trailing direction given the direction of rotational movement—from the leading edges 56' of the uppermost blade segments 46a'-46d'. Thus, as best shown in FIG. 7, as the compound blade moves from right to left as viewed in FIG. 7 (clockwise as viewed in FIG. 6), the leading edge 56' of the uppermost blade segments serve to preload highly viscous gel-like emulsion into the region of the beveled leading edge 56 of the lowermost blade segments so as to insure positive displacement and extrusion of like quantities of emulsion through all distributor outlet ports 45 irrespective of the viscosity of the emulsion and/or the location of the distributor outlet port.

EXAMPLE I

In carrying out the present invention, essentially dry, integral, solid lipid pellets having a moisture content on the order of approximately 30% were produced by introducing the following ingredients into the heated premix chambers 11, 12 maintained at a temperature on the order of 98° F.: water, comprising approximately 30% of the initial mixture by weight; a coagulant in the form of a suitable alginate (here, sodium alginate) in the range of 0.0025% to 0.003% by weight; ammonia ($NH_3$) in the range of 0.005% to 0.0075% by weight; bentonite in the range of 0.01% to 0.10% by weight; and, finally, processed and rendered yellow grease on the order of approximately 70% by weight. The distributors 24, 25 and positive displacement piston pump 22 were configured to produce relatively elongate maggot-like particles which were extruded as discrete particles into a 1% calcium chloride ($CaCl_2$) ion bath 29 and which, upon exiting rotary cylinder 36, had a moisture content of 30% and a lipid content of 70% with the particles being in dry, solid, integral form throughout their entire structure, and being devoid of any oily feel or surface texture.

The foregoing pellets were then packaged in containers which, although not sealed, prevented direct exposure of the pellets to atmospheric conditions. It was found that such products maintained their integrity and moisture content substantially unchanged over literally months of storage without being subjected to rancidity, fungal growth and/or deterioration of any sort.

Others of the pellets thus formed were exposed to atmospheric conditions without heating, and it was found that such pellets tended to further dewater during such exposure, ultimately approximating 3% moisture levels and even lower moisture levels. In some instances, the pellets were subjected to very low, very dry and/or pulsating heat which tended to increase the rapidity of the dewatering process, but did not in any way damage the integrity of the pellets. In all such cases, the pellets were not subjected to rancidity or spoilage and they remained substantially heat insensitive; although, at about 1% moisture content they tended to take on the texture of grease balls as contrasted with firm, dry lipid pellets or particles.

In the practice of the present invention in accordance with Example I, the ammonia ($NH_3$), even though added in minute concentrations, served a number of useful functions. Thus, it served to make the constituent ingredients of the lipid/water system more compatible:, it enhanced the emulsifying properties of the coagulant; and, it extended the usefulness of the coagulant—that is, the ammonia permitted the pelletization process to proceed with relatively small quantities of coagulant with the advantage that, unlike sodium hydroxide (NaOH) or potassium hydroxide (KOH) which could be used similarly to partially saponify the lipids, $NH_3$ evaporated from the system leaving no residue which could prove harmful under some circumstances when used as a fodder.

Similarly, the bentonite tended to increase the lipid absorptive capacity of the aqueous coagulant and enabled effective pelletization of emulsions containing up to 70% lipids—i.e., the bentonite functioned as a solubilized coagulant expander; whereas, without bentonite, it has been found that the system tends to operate effectively only with lipid concentrations on the order of from about 35% to about 40%, or slightly more; although in these latter instances, it was possible to subsequently dewater the pellets to any desired degree by either exposure to atmospheric conditions for a sufficient length of time and/or by the judicious application of heat.

In experimentation, it has been found that while excellent results are achieved using algin as a coagulant and bentonite as an additive or expander to increase the absorptive capacity of the aqueous coagulant system, other materials can be employed. For example, experimentation has indicated that extracts of okra or aloe vera, as well as pectins, will serve as suitable coagulants. Consequently, as used herein and in the appended claims, the term "algin-like coagulant" is intended to embrace pectins as well as extracts of okra and aloe vera.

Similarly, it has been found that other materials can be employed in lieu of bentonite and achieve the desired result of increasing the absorptive capacity of the aqueous coagulant for lipids. Such other solubilized coagulant expanders include, for example, puffed rice or wheat, wheat middlings, wheat bran, beet pulp, alfalfa meal, verxite (expanded mica), and/or corn cob meal. However, while such alternative materials can achieve essentially the same increase in absorptive capacity of the aqueous coagulant for lipids using somewhat less of the additive by weight than bentonite, such materials tend to be more costly and are more space consuming in the final product—that is to say, the lipid density in the solid dry pellet or particle is not as great as when using bentonite. Accordingly, it is preferred, but not essential, that bentonite and/or ammonia be employed.

EXAMPLE II

Eleven (11) ounces of sodium alginate comprising approximately 0.0045% by weight of the total mix, was mixed with eighty-seven (87) pounds of water comprising 57.735% by weight of the overall mix, and the resulting slurry was continuously agitated. Thereafter, one (1) pound of bentonite comprising 0.0066% by weight of the overall mixture was added to the solubilized coagulant slurry and mixing continued. Sixty-two (62) pounds, five (5) ounces of processed yellow grease was heated to approximately 125° F. and slowly poured into the solubilized coagulant/bentonite slurry while mixing continued. The resulting gel-like emulsion was then extruded in discrete particles into a 1% calcium chloride ($CaCl_2$) ion bath to form generally spherical pellets which were permitted to remain in the bath for ten minutes.

The resulting pellets were then removed from the bath and tests for the moisture content revealed a moisture content of approximately 57.7%. The pellets were then spread out and exposed to atmospheric conditions for 24 hours. At the end of 24 hours, the pellets exhibited firm, dry, non-oily surface characteristics; and, tests revealed that the moisture content was 30%. The pellets were then placed in a closed container and stored for two months. At the end of the two-month storage period, the pellets exhibited no discernible change in appearance and tests indicated that the moisture content was 29%.

EXAMPLE III

Lipid pellets were formed in accordance with the procedure of Example I except that the water content was increased to approximately 40% of the final mixture by weight, while unprocessed, liquified yellow grease, reduced in quantity to on the order of approximately 60% by weight, was added to the solubilized algin/bentonite mixture. The resulting pellets, initially having a moisture content of approximately 40%, were packaged and later subjected to testing with birds to determine the true metabolizable energy (TME) of the sample grease pellets on a comparative basis with unprocessed yellow grease derived from the same source as used in the formation of the pellets. The sample pellets were first tested to determine their moisture content; such testing establishing that the pellets were 62.4% dry matter and 37.6% moisture and indicating that exposure to atmospheric conditions had reduced the moisture content slightly. The unprocessed yellow grease was presumed to be 100% dry matter. The pellets and the unprocessed grease were each mixed with corn at a ratio of 15% test material to 85% corn and fed to the birds. Excreta samples were dried in a forced air oven at 60° C. and then assayed. The results of the assay were a follows:

|  | Kcal/g (as is) | Kcal/g dry matter | Kcal/lb (as is) |
| --- | --- | --- | --- |
| Pellets | 5.90 ± .14 | 9.46 | 2680 |
| Grease | 9.97 ± .18 | 9.97 | 4532 |

The data clearly indicated that the test pellets were virtually completely digestible and absorbable under the conditions of the test and, that on a comparative basis, the TME of both the sample grease pellets and the unprocessed grease were essentially the same.

EXAMPLE IV

In keeping with the invention, essentially dry, integral, solid lipid pellets having a moisture content of approximately 20% and suitable for use as a butter substitute or replacement were produced by introducing the following ingredients into the heated premixing chambers 11, 12 maintained at a temperature on the order of 98° F.: water, comprising approximately 50% of the initial mixture by weight; a coagulant in the form of a suitable alginate (here, sodium alginate) comprising approximately 0.005% of the initial mixture by weight; and, a commercial grade of coconut fat, melted and in a liquid form, comprising approximately 50% of the initial mixture by weight. The distributors 24, 25 and positive displacement piston pump 22 were configured to produce essentially small, pea-shaped pellets which were extruded as discrete particles into a 1% calcium chloride (CaCl$_2$) ion bath 29 and which, upon exiting rotary cylinder 36, had a moisture content of about 50% and a coconut fat content of about 50%. The pellets were then air dried to reduce their moisture content to about 20% by weight, thereby increasing the coconut fat content to about 80% by weight. At this stage, the pellets were in an essentially dry, solid, integral form throughout their entire structure, and were devoid of any oily feel or surface texture.

The resulting pellets presented a visual appearance of small pea-shaped globules of butter. The pellets, when heated, either with or without a food product such as peas or similar vegetable products, tended to give up about 50% of their coconut fat content; but, otherwise, the algin, which was cross bonded with calcium, remained insoluble in water and the pellets tended to maintain their integrity. The pellets were, nonetheless, edible and the released coconut fat tended to flavor the vegetable product in the same fashion as natural butter. It was noted however, that the discrete coconut fat pellets, when placed in the mouth, immediately dissolved and gave up all coconut fat.

Certain of the coconut fat pellets produced as set forth in this Example IV were further air dried to reduce their moisture content to essentially only the water of hydration of the pellet and its constituent ingredients—i.e., to a moisture content on the order of only about 5% by weight of the pellet. The thus dried pellets were then sprayed with a liquid phosphate. It was found that when pellets containing a small amount of phosphate were introduced with coconut fat pellets devoid of phosphates in a foodstuff/water environment and heated, the phosphate reacted with the calcium to form calcium phosphate; and, the algin, no longer being cross-bonded with calcium, reverted to its water-soluble state. As a consequence, the pellets dissolved in the food product being heated and gave up all of their coconut fat.

The foregoing experiment was then repeated, substituting pure melted butter for the coconut fat; and, precisely the same results were observed. Identical results were also observed when substituting margarine, chicken fat, beef tallow, pork fat and lard for the coconut fat.

Coconut fat pellets formed as described in this Example IV and devoid of a phosphate spray coating were also admixed with food products in the presence of a lightly encapsulated phosphate pellet which, when introduced into the water being used to heat the food product, dissolved, freeing the phosphates which then reacted with the calcium in the cross-bonded algin/calcium/coconut fat pellet to form calcium phosphate and to thereby render the algin in the pellets water soluble. In all of the foregoing cases involving the use of phosphates, the calcium phosphate produced formed a desirable and nutritional additive to the food product.

Coconut fat pellets devoid of phosphate were also admixed with numerous other food products including, for example, stuffings and instant wild rice dishes In each case, it was found that sufficient coconut fat was released during the cooking process to provide the desirable flavoring for the food product; yet, at the same time, the water-insoluble pellet formed yellow buds spread throughout the food product which looked quite appealing and attractive and substantially enhanced the aesthetic appearance of the food product.

EXAMPLE V

A pelletized animal feedstock was prepared utilizing dry particulate, nutritive materials and dry, solid, integral lipid pellets formed in accordance with the procedure of Example I, with all such dried materials being introduced into, and processed through, a conventional California pellet mill. More specifically, the following ingredients were introduced into a California pellet mill premixer in the proportions indicated: eighty (80) pounds of alfalfa; twenty (20) pounds of cracked corn; twenty (20) pounds of wheat middlings; five (5) pounds of meat meal; and, three (3) pounds of lignin. The total dry mixture of the foregoing ingredients—viz., one hundred twenty-eight (128) pounds of dry nutritive ingredients—was thoroughly mixed to produce a homogeneous dry mixture; and, thereafter, thirty-seven (37) pounds of dry, solid, integral grease pellets of approximately one-eighth inch diameter and formed in accordance with the procedure of Example I, but dried to provide pellets having a ninety percent (90%) lipid concentration, were then introduced into the California pellet mill premixer. Mixing was continued for two minutes to insure uniform dispersal of the dry lipid pellets throughout the remaining dry ingredients. Thereafter, the mixture was discharged into the mill die of the California pellet mill which had a diameter of one-quarter inch and which was provided with a cutting blade adjusted to produce pellets approximately 7/16 inch in length. The resulting pellets contained: approximately 77.9% dry nutritive-ingredients by weight; approximately 19.9% dry, solid, non-flowable, stable, pelletized lipids by weight; and, approximately 2.2% moisture by weight. The pellets formed were completely normal in terms of their structural characteristics and integrity, although the color was slightly darker than identical pellets formed without inclusion of pelletized lipids; and, they showed no abnormal tendency to break, flake or otherwise disintegrate. The pellets did not exude lipids, even after storage for several months; exhibited no oily surface film; and, the lipid contents remained stable and did not exhibit characteristics of rancidity.

EXAMPLE VI

Lipid pellets were formed in accordance with the procedure of Example I utilizing non-detergent soap stock (NDSS) as the principal lipid source—it being understood by those skilled in the art that NDSS is a nutritionally valuable waste product resulting from various ore flotation processes, soybean and/or soya oil processing operations, etc. For example, NDSS resulting from a typical ore flotation process will commonly include between 80% and 95% oil—in the present Example, the oil was soya oil, a soybean extract; but, other oils are also employed in some ore flotation processes—and between 20% and 5% in the form of combined Foots—i.e., phosphates, sodiums, heavy metals, minerals, etc., combined with free fatty acids of the particular oil being used.

In carrying out the process of the invention using NDSS, a liquid lipid emulsion was formed utilizing the following ingredients in the indicated amounts: one (1) part water by weight; two (2) parts NDSS by weight; a coagulant in the form of a suitable alginate (here, sodium alginate) in the range of from 0.0025% to 0.005% by weight; ammonia ($NH_3$) in the range of 0.005% to 0.0075% by weight; bentonite in the range of 0.01% to 10% by weight; and, finally, trisodium phosphate (TSP) in the amount of 0.005% by weight. Discrete quantities of the emulsion were then extruded into a 1% calcium chloride ($CaCl_2$) ion bath 29; and, upon exiting the rotary cylinder 36, exhibited a moisture content of approximately 33%, a soya oil content of approximately 54%, and a combined Foots content of approximately 13%. Trisodium phosphate (TSP) was employed to block reaction of heavy metals contained within the combined Foots with the coagulant. The resulting pellets were dry, solid, integral pellets which permitted usage as a fodder without encountering separation of the soya oil and Foots compounds.

The same experiment as outlined above was repeated without the addition of bentonite; and, while it was found that the materials readily pelletized as indicated herein, it was discovered that certain pigments contained in the NDSS tended to leach out of the finished pellets. However, upon the addition of bentonite or other filtering clays, the leaching tendency was inhibited.

OPTIONAL PROCESS MODIFICATIONS

While there have hereinabove been described methods and apparatus for forming firm, dry, solid, discrete lipid pellets or particles containing relatively high concentrations of lipid materials, those skilled in the art will appreciate that various process modifications can be employed without departing from the spirit and scope of the invention as expressed herein and in the appended claims. For example, as hereinabove described, the pellets or particles may be deposited in or formed within an ion bath of a calcium metal salt such, for example, as calcium chloride ($CaCl_2$). However, the pellets or particles may be "set" in other ways such, for example, as being deposited in, or formed in, a bath containing a suitable acid—e.g., hydrochloric acid (HCl) in sufficient quantity to form an aqueous acid solution having a pH which preferably does not exceed from 3 to 3.5. Alternatively, since the principal ingredient of the pellets or particles comprises a lipid, the pellets or particles may be deposited in cold ice water to cause setting; and, thereafter, sprayed with calcium or hydrochloric acid for purposes of reacting the algin component.

In those instances where it is desired to make the pellets or particles firmer and harder than normal, relatively equal amounts of calcium carbonate and a suitable acid such as adipic or citric acid can be added to the solubilized algin mixture in the premixing chambers 11, 12, generally in amounts on the order of about 1% by weight per ingredient.

It is further within the scope of the invention to formulate the solubilized algin mixture in such a manner that the resulting gel-like emulsion can be introduced into molds where it will set automatically into the desired shapes. To accomplish this, one can add a suitable calcium source such, for example, as bonemeal, calcium hydroxide (CaOH), or calcium sulfate ($CaSO_4$) to the mixture along with a suitable acid such as adipic acid or citric acid and a retardant, such as trisodiumphosphate (TSP) or sodium hexametaphosphate, which serves to retard the calcium/algin reaction until the emulsion has been injected into the desired molds. Moreover, such a calcium source and a retarding agent can be added to the solubilized coagulant mixture without an acid source, with the emulsion then being extruded into, or otherwise deposited into, a suitable acid bath such as a hydrochloric (HCl) acid bath having a pH of on the order of not more than 3 to 3.5.

In some instances, it may be desirable to form the lipid pellets or particles with an external oily film so as to promote adhesion of the pellets or particles to conventional feed grains or the like with which the pellets or particles are to be admixed, thereby preventing classification of the lipid pellets or particles and the conventional feed stock. To accomplish this, it has been found that the ratio of coagulant to lipid can be reduced; and, as progressively reduced, there is a tendency to form the desired oily film on the external surface of the resulting product.

Moreover, the present invention also contemplates the use of blends of lipids within the gel-like solubilized coagulant/lipid emulsion. Indeed, when dealing with certain lipids having relatively low temperature melting points, it has been found desirable to blend such lipids with other lipids having higher melting points or, alternatively, to increase the amount of bentonite added to the mixture.

OPTIONAL ADDITIVES/ATTRACTANTS

Those skilled in the art will appreciate that in the practice of the present invention, certain species-specific attractants may be incorporated in the lipid pellets or particles to enhance their acceptance by the particular animals to be fed. Such species-specific attractants may be in the form of additives and/or in the form of particular colors, shapes or configurations. Fish, for example, tend to be attracted by specific shapes and/or colors. Chickens tend to have a preference for fats in their diet and, given the opportunity, might selectively consume the fat pellets while ignoring the feed grains. Consequently, when forming pellets or particles for chicken consumption, it may be desirable to insure that the pellets are compatible in size, shape and color to the grain with which the fat pellets are to be admixed. To accomplish this, suitable dyes or coloring matter may be added to the aqueous coagulant solution. Beef cattle, on the other hand, tend to be attracted by sweets; and, consequently, when intended for this type of animal, the pellets may incorporate molasses in the range of from 0% to 6% by weight and, preferably, in the range of from 0% to 1%.

A further typical example where an attractant might find particularly advantageous use is in connection with the use of lipid pellets or particles made in accordance with the present invention as a swine feed supplement. Thus, swine are known to be highly selective in their eating habits and will tend to eat only those items that they find acceptable, while rejecting all other items. Moreover, swine tend to have a keen sense of olfaction and tremendous tactile abilities associated with their noses Indeed, as is well known, a swine's nose is designed to seek out epigenous and endogenous fungus; and, they are particularly attracted to fungi such as truffles or morels. Accordingly, it is within the scope of the present invention to select a mycelium, carpophores, ascispores and/or basidospores of appropriate fungi—e.g., an ascomycetous fungi or morchella, esp. M. esculenta, which can be added to the solubilized coagulant mix in sufficient quantity to act as an attractant—i.e., approximately 1%—or sufficient viable matter in the presence of sugar so as to promote the formation of a desirable fungal growth from within the pellet or particle. Alternatively, the pellets or particles may be coated externally with such materials. In either instance, the amounts of material additives are, to a high degree, matters of choice; but, excellent results can be achieved when the amount of fungal material added is on the order of 1% by weight of the total mixture, while sugar is added in amounts on the order of up to 2% by weight. Spent yeast may also be used to some extent in lieu of fungal growth as swine attractants.

Indeed, the lipid content of the pellets or particles itself comprises an attractant for many species of animals. Thus, it is known that dry kibbles when fed to canine and/or felines will generally require certain additives to make the dry kibbles palatable to the particular animal being fed. Prior to the advent of the present invention, the inclusion of lipids in or with dry kibbles, although desirable, has not been practicable—principally because of problems of rancidity and spoilage. However, with the present invention, lipid pellets may be incorporated within the kibble structure or may be loosely admixed with kibbles to increase the palatability and nutritional value thereof. Similarly, the lipid content of the pellets or particles when used as a fish feed overcomes the serious problem presently encountered of pellet dissolution whereby upwards of 50% of the feed is lost. Moreover, the increased concentration of lipids makes it possible to cause the pellets to float which is extremely desirable for some hatchery fish.

Optional Additives/Others

As previously indicated, the present invention readily permits of the addition of a virtually limitless range of additives directly to the solubilized coagulant mix for incorporation in the pellet or particle structure. When the pellets or particles are to be used as feed supplements, such additives may take the form of medications, antioxidants, or preservatives. For example, suitable antibiotic medications might include penicillin, erthyromycin, streptomycin, sulfas, etc. Antifungal medications might include actinonomycin. Typical antioxidants might include ethoxyquin, BHT, or citric acid as an antioxidant synergist. Suitable preservatives might include sulphur dioxide ($SO_2$) or $SO_2$ releasing compounds, ethylene oxide, propionic acid, benzoic acid, or propylene glycol, for example. All of the foregoing may be added to the solubilized coagulant mix in any desired proportions to meet the particular needs. Similarly, a wide range of vitamins or mineral supplements may be included in the mix in any desired proportions.

When the lipid pellets or particles are to be used as controlled-time-release agents for such materials as pesticides—e.g., attractants or repellants which may be in the form of pest control scatters—insecticides, herbicides, fertilizers, hormones and/or growth nutrients, deodorants, etc., the necessary additives can again be added to the solubilized coagulant mix in any appropriate amounts. For example, suitable contact insecticides might include DDT, pyrythrins or organophosphorus compounds; attractant-type scatter might include pheromones, ammonia, anethole, or isoamyl salicylate; while repellant-type insecticides might include benzyl benzoate, dibutyl phathalate, or 2-phenylcyclohexanol. Similarly, suitable herbicides such, merely by way of example, as petroleum oils may be included within the solubilized coagulant mix and thus incorporated in the finished lipid product. Fertilizers such as animal wastes, ammonium sulfate, or the like, may be incorporated in the product; as can suitable growth nutrients or hormones such as distibesterol.

It has further been found that suitable deodorants can be added to the gel-like emulsion when forming lipid pellets in accordance with the present invention. Such additives will prove highly desirable for usage in connection with sewage lagoons, cattle farms, swine farms and the like. Thus, the lipid pellet serves as a controlled time-release carrier for the deodorant; and, in those situations where the pellets are employed in odoriferous liquid environments, the fat content of the pellets serves to cause the pellets to float on the surface of the odoriferous liquid, thereby enhancing the deodorizing effect of the deodorant released over time.

It has been found in the practice of the present invention that a wide range of additives such as the foregoing can be readily added to the solubilized coagulant mix and thus incorporated in the finished lipid pellet or particle in virtually any desired quantity and without adversely affecting the coagulant reaction. Indeed, it is within the scope of the invention to include feed materials such as grains, micronutrients, or the like within the solubilized coagulant mix and in sufficient amounts that the finished pellet or particle comprises a balanced feed ration having any desired percentage of lipid content.

Thus, there have hereinabove been described methods and apparatus for forming solid, integral, dry lipid particles or pellets which may comprise essentially high concentrations of lipids and relatively low concentrations of moisture or, alternatively, a wide range of other materials and a desired range of lipid materials. The resulting pellets may be used by themselves as a complete feed ration or, alternatively, only as a lipid feed supplement; concentrated lipid pellets or particles may be readily incorporated in range blocks without risk of bleeding and consequent spoilage; highly concentrated lipid pellets or particles may be readily admixed with feed grains and the like in conventional pellet mills to form a balanced feed ration; and, the lipid pellets may comprise a controlled time-release carrier for various materials.

A typical range block, for example, will be designed to meet the specific nutritive needs of the animals being fed and may comprise a wide range of materials. For example, such range blocks will often provide a guaranteed analysis with regard to crude proteins, crude fats, crude fibers, salt, vitamins and other micronutrients such as calcium, phosphorous, iodine and the like. In most instances, the amount of crude fats incorporated in such range blocks has been limited to on the order of 2% or less—such limitation being directly attributable to the fact that liquid or liquifiable fats will tend to bleed out of the range block and thus spoil and/or damage the block. While the aforesaid Schroeder et al U.S. Pat. No. 4,027,043 suggests that the range block there described can contain a broad range of up to 30% fat and a preferred range of from 5% to 20% fat, it has been found that such quantities of fat simply cannot be maintained in the range block which is commonly subjected to heat, causing otherwise solid lipids to liquify and bleed. However, with the present invention, the solid, discrete, highly concentrated lipid particles are not heat sensitive and, consequently, can be readily incorporated in the other materials defining the range block without fear of bleeding and damage.

It has been found that the cost of solid, firm, dry, integral lipid pellets or particles produced in accordance with the invention will vary widely dependent on many variables including, for example, the type and amount of coagulant and/or lipids added, and the types and quantities of optional additives included. However, for essentially pure lipid pellets or particles ranging from about 65% to about 95% lipids exclusive of water of hydration, costs are estimated to fall generally in the range of from about $2.80/CWT to about $6.00/CWT and, a probable practical range of about $4.00-$5.00/CWT.

Those skilled in the art will appreciate that terms such as "animal" and/or "animal feed stock" as used herein and in the ensuing claims are used in a non-limiting sense and are intended to cover, for example, fats and oils derived from marine creatures, fish wastes, a wide variety of vegetable wastes, silage, and the like.

What is claimed is:

1. A dry, firm, solid lipid pellet consisting essentially of at least about 95 percent by weight lipid, a water-insoluble alginate salt in an amount effective to form said pellet, and no more than about 5 percent water.

2. A pellet according to claim 1 consisting essentially of at least about 95 percent by weight lipid, said water-insoluble alginate salt, and no more than about 2 percent water.

3. A dry, firm, solid lipid pellet consisting essentially of at least about 90 percent by weight lipid, between about 3 percent and 5 percent by weight protein, a water-insoluble alginate salt in an amount effective to form said pellet, and no more than about 5 percent water.

4. A pellet according to claim 3 consisting essentially of at least about 90 percent by weight lipid, between about 3 percent and 5 percent by weight protein, said water-insoluble alginate salt, and no more than about 2 percent water.

5. A dry, firm, solid lipid pellet consisting essentially of at least about 80 percent by weight lipid, between about 10 percent and 12 percent by weight protein, a water-insoluble alginate salt in an amount effective to form said pellet, and no more than about 5 percent water.

6. A pellet according to claim 5 consisting essentially of at least about 80 percent by weight lipid, between about 10 percent and 12 percent by weight protein, said water-insoluble alginate salt, and no more than about 2 percent water.

7. A pellet according to claim 1, 3, 5, 2, 4, or 6 wherein said water-soluble alginate salt is calcium alginate.

8. A pellet according to claim 1, 3, 5, 2, 4, or 6 wherein said lipid is a fat.

* * * * *